United States Patent [19]

Searcy

[11] Patent Number: 4,547,991
[45] Date of Patent: Oct. 22, 1985

[54] FISHING LINE SYSTEM

[76] Inventor: Albert P. Searcy, 18015 Cantara St., Los Angeles, Calif. 91335

[21] Appl. No.: 593,523

[22] Filed: Mar. 26, 1984

[51] Int. Cl.⁴ ............................................ A01K 87/00
[52] U.S. Cl. ...................................... 43/18.1; 43/25; 242/84.1 N
[58] Field of Search ...................... 43/25, 4, 18.1, 18.5; 242/47.09, 84.1 R, 84.1 N, 84.1 K, 394, 397; 254/394, 397

[56] References Cited

U.S. PATENT DOCUMENTS

| 2,292,457 | 8/1942 | Maier | 254/394 |
| 2,613,045 | 10/1952 | Kester | 242/84.1 F |
| 2,806,700 | 9/1957 | Heimers | 43/18.1 |
| 2,851,811 | 9/1958 | Mantell | 43/18.1 |
| 2,945,694 | 7/1960 | Heimers | 43/18.1 |
| 3,863,381 | 2/1975 | Ladany | 43/15 |
| 4,216,602 | 8/1980 | Daniels | 43/18.1 |
| 4,283,875 | 8/1981 | Daniels | 43/18.1 |

Primary Examiner—Gene P. Crosby
Attorney, Agent, or Firm—Allan M. Shapiro

[57] ABSTRACT

A fishing line system is provided for attachment onto a fishing rod having a mounting member with front and rear carriers thereon. A plurality of line guide wheels are mounted in each of the front and rear carriers. Line from the conventional reel on the rod passes around the line guide wheels on its way to the tip of the rod. Inertial energy of the rotating guide wheels with the line tends to smooth out line velocity, and line stretch over the longer length of line tends to reduce peaks in line tension.

2 Claims, 6 Drawing Figures

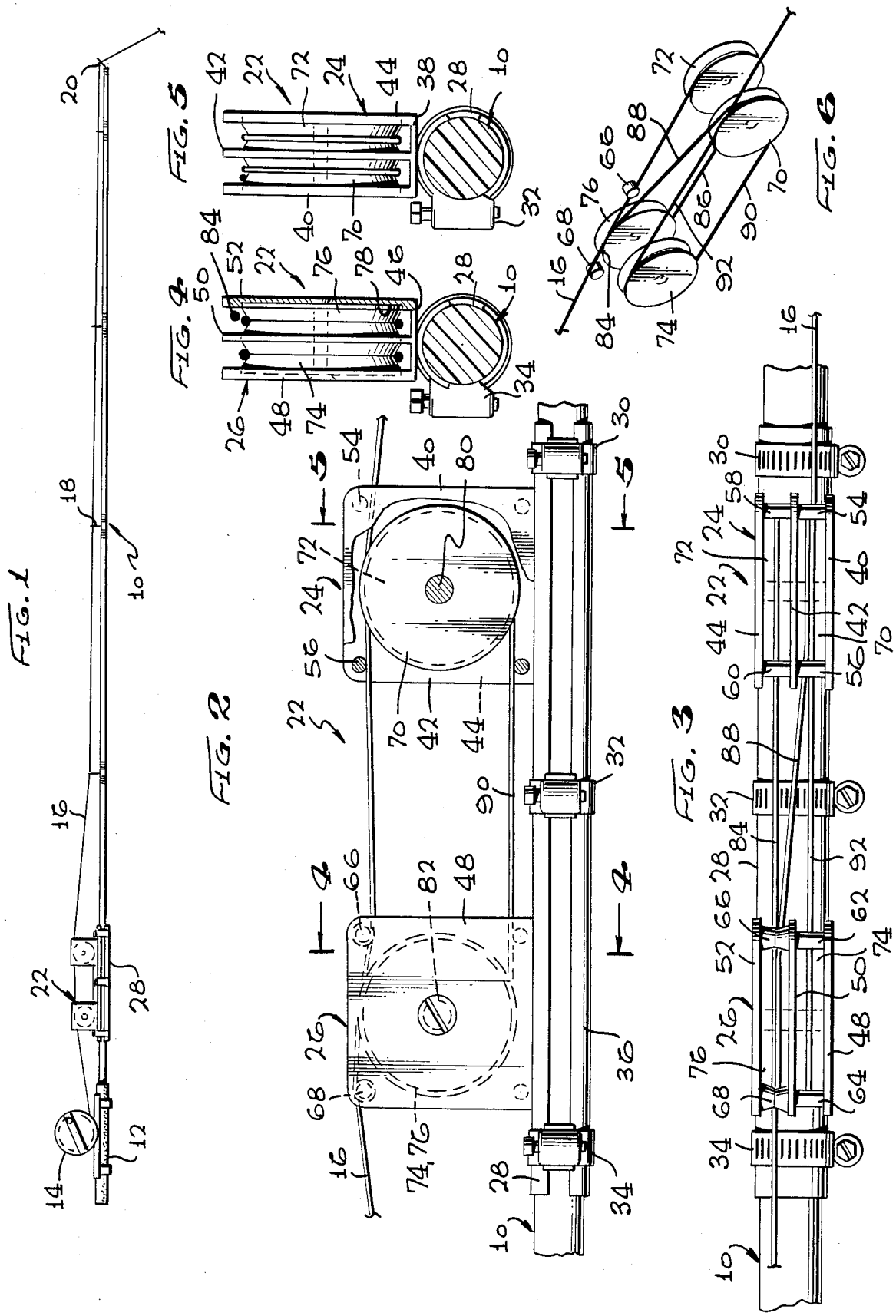

FISHING LINE SYSTEM

BACKGROUND OF THE INVENTION

This invention is directed to a fishing line system wherein the fishing line passes around a plurality of line guide wheels between the line supply reel and the tip of the rod.

The conventional fishing rod has a tip on one end and a manual handle on the other. There is a place adjacent the handle for mounting a conventional reel. The reel has a drum which usually carries a relatively long length of fishing line thereon and, in the conventional system, this line passes through one or more guides along the length of the rod and out through a guide at the tip of the rod. A manual crank on the reel is connected to the drum so that cranking thereof rotates the drum for winding in the fishing line.

Various improvements have been made in the reels and rods. A two-roller fishing line guide is described in Ladany U.S. Pat. No. 3,863,381 to supply tension during rewinding to aid in organized rewinding of the line. Mantell U.S. Pat. No. 2,851,811 and Daniels U.S. Pat. Nos. 4,216,602 and 4,283,875 have traveling sheaves which change the amount of line between the reel and the rod tip for controlling line tension and being for supplying and retrieving line faster than is usually possible with conventional fishing reels. Such moving sheave devices are complex and are subject to mechanical difficulties due to the mounting of the traveling sheaves. It is difficult to maintain proper operability of such devices in the presence of water, particularly salt water.

SUMMARY OF THE INVENTION

In order to aid in the understanding of this invention, it can be stated in essentially summary form that it is directed to a fishing line system wherein front and rear carriers are secured to a mounting member which maintains the carriers in spaced position. A plurality of line guide wheels is mounted on each carrier so that the fishing line system can be mounted on a fishing rod and line from a fishing reel can be passed around the guide wheels as the line extends to the tip of the rod to provide additional line length between the reel and the rod tip to make easier the cranking of the reel.

It is, thus, an object and advantage of this invention to provide a fishing line system which can be demountably secured to a conventional fishing rod to aid the cranking in of fishing line.

It is another object and advantage of this invention to provide a fishing line system wherein a plurality of line guide wheels are demountably carried on a fishing rod to direct the fishing line on a longer path between the reel and rod tip to achieve superior handling conditions for the fishing line as it is wound on the conventional reel during winding in of the line.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a side-elevational view of a conventional fishing rod with its reel and carrying the fishing line system thereon.

FIG. 2 is an enlarged side-elevational view of the fishing line system as shown in FIG. 1, with parts broken away and parts taken in section.

FIG. 3 is a plan view of the structure shown in FIG. 2.

FIG. 4 is an enlarged section taken generally along the line 4—4 of FIG. 2, with the idler rolls and spacer bars omitted for simplicity and clarity of illustration.

FIG. 5 is a section taken generally along the line 5—5 of FIG. 2, with the spacer bars omitted for simplicity and clarity of illustration.

FIG. 6 is a schematic isometric view of the fishing line path through the system of this invention.

DESCRIPTION OF THE PREFERRED EMBODIMENT

Conventional fishing rod 10 is shown in FIG. 1. It has a handle 12 with a reel 14 secured to the rod on or adjacent the handle. Fishing line 16 extends from the reel, through one or more eyes 18 secured to the rod along the length thereof, and out through eye 20 on the tip of the rod. In conventional uses, reel 14 is employed to release the reel in fishing line 16 as required by the fisherman during his use of the rod. In accordance with this invention, system 22 is secured on the rod and engages the fishing line to manage the fishing line.

As is seen in FIGS. 2, 3, 4 and 5, fishing line system 22 comprises front and rear carriers 24 and 26, respectively, secured to mounting member and spacer 28. Mounting member and spacer 28 is a mounting member because the front and rear carriers are securely mounted thereon. It is a spacer because they are mounted thereon in spaced position, as shown in FIGS. 1, 2 and 3. Mounting member and spacer 28 is in the form of a cylindrical tubular segment having an interior radius suitable for fairly close engagement around the exterior surface of rod 10 adjacent its handle. Mounting member and spacer 28 is detachably secured to the rod by means of clamps 30, 32 and 34 which engage around mounting member and spacer 28, around rod 10 and around stress reliever 36. Stress reliever 36 is of about the same size and shape as the mounting member 28. It is employed to strengthen the rod over the length of system 22 and to prevent the clamps 30, 32 and 34 from applying an excessive localized stress to the rod 10.

The front and rear carriers are each configured in substantially the same way. Front carrier 24 has a bottom plate 38 secured to mounted member 28, see FIG. 5. Right plate 40, center plate 42 and left plate 44 are secured to bottom plate 38. Similarly, as seen in FIG. 4 with respect to the rear carrier 26, bottom plate 46 is secured to mounting member and spacer 28 some distance away from the bottom plate 38. Right plate 48, center plate 50 and left plate 52 are secured to bottom plate 46. The bottom plates maintain the spacing between the right, center and left plates adjacent the bottom thereof. In order to maintain spacing between the top edges of the plate, spacers 54 and 56 are positioned between plates 40 and 42, see FIG. 3, and spacers 58 and 60 are positioned between the plates 42 and 44. These spacers can be tubular with a screw passing therethrough. The screw would engage both the left and right side plates to hold the structure in compression on the spacer. In addition, spacers 62 and 64 are positioned between plate 48 and 50. Similar spacers, preferably of smaller diameter, are positioned between the plates 50 and 52. However, in order to guide the fishing line 16, guide rollers 66 and 68 are rotatably mounted on those spacers. These spacers and guide rollers are omitted from FIGS. 4 and 5 for purposes of clarity.

Fishing line guide wheels are mounted between the plates. Front right guide wheel 70 is mounted between plates 40 and 42, while front left guide wheel 72 is mounted between plates 42 and 44. Similarly, rear right guide wheel 74 is mounted between plates 48 and 50, while rear left guide wheel 76 is mounted between plates 50 and 52. All plates are recessed and the guide wheels extend into the recesses. This structure is best seen in FIG. 4 with the guide wheel 76 extending into the recess 78 and left side plate 52. Pivot pin 80 extends through all three plates in the front carrier 24 to pivotably mount the front guide wheels 70 and 72. Similarly, pivot pin 82 extends through all three of the plates in rear carrier 26 to rotatably mount the rear guide wheels 74 and 76. The guide rollers and the guide wheels are each provided with a concentric guide notch in the outer surface thereof, with a notch in the shape of truncated right circular cones with their smaller ends joining. The rotatable guide rollers and guide wheels thus provide a system for managing the fishing line 16 between the reel and the tip of the rod.

As seen by the fisherman, when he holds the handle 12 and with the reel 14 and system 22 on the top of the rod, the fishing line 16 passes from the reel, over guide roller 68 and under guide roller 66 in stand 84 where it is away from the surface of rear left guide wheel 76, see FIGS. 4 and 6. From there, the fishing line passes over the top of, around the front of and back under front left guide wheel 72 and extends in stand 86 back around, and up over rear left guide wheel 76 to stand 88. The fishing line 16 passes diagonally to the top of front right guide wheel 70, and thence around the front and down under in stand 90 to rear right guide wheel 74. It passes under, back and around to the top of rear right guide wheel 74 and extends in stand 92 under spacers 56 and 54, over the top of front right guide wheel 70 without significant contact therewith, and out the front of system 22 where it extends through one or more eyes 18 and out through eye 20 on the tip of the rod.

The fishing line system 22 improves the facility of use of the fishing rod 10 with its reel 14. During fishing, when the bait is in the desired location, the line 16 is extended. The fishing line system is most useful during retrieval of the line. When the fisherman desires to retrieve the line (either due to a bite, the hooking of a fish, or simple need for inspection of the bait), he winds in the line by winding the reel 15. During this operation, the line 16 passes around the multiple line guide wheels. These guide wheels provide a longer length of line between the tip 20 and reel 14 due to the path described around the guide wheels. System 22 provides an easier reeling in of the line. This easier reeling in is probably caused by both the longer length of the line with the consequent line stretch, and the inertia provided by the line guide wheels as they are driven by the moving line. The inertial energy exchange between the moving line and the rotating guide wheels tends to smooth out line velocity. The line stretch tends to reduce the peaks in line tension which would result from uneven reeling speed. Thus, these two effects, working together and separately, provide more uniformity in line tension and the reeling effort.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A fishing line system comprising:
   a mounting member for attachment to a fishing rod;
   a front pivot pin and a rear pivot pin, said pivot pins being spaced from each other and having their axes fixedly positioned with respect to said mounting member;
   right and left front guide wheels mounted on said front pivot pin so that said guide wheels are rotatably mounted with respect to said mounting member, said front right and left guide wheels being axially spaced with respect to each other;
   right and left rear guide wheels mounted on said rear pivot pin so that each of said rear guide wheels is rotatably mounted with respect to said mounting member, said right and left rear guide wheels being axially positioned with respect to each other along the length of said rear pivot pin, each of said guide wheels having a surface of revolution thereon around its respective axis of rotation with said surfaces of revolution being such as to guide fishing line therearound so that fishing line can extend successively around said front and rear guide wheels;
   right and left front plates mounted on said mounting member with said front guide wheels therebetween, and right and left rear plates mounted on said mounting member with said rear guide wheels therebetween;
   a recess in each of said plates adjacent said guide wheels, said guide wheels extending partway into said recesses so that said guide plates guide fishing line onto said surfaces of revolution of said guide wheels;
   spacer pins between said plates, said spacer pins being positioned between said plates away from said mounting member; and
   at least one of said spacer pins being provided with a guide roller thereon so that fishing line is guided by said guide roller onto one of said guide wheels.

2. A fishing line system comprising:
   a mounting member for attachment to a fishing rod;
   a front pivot pin and a rear pivot pin, said pivot pins being spaced from each other and having their axes fixedly positioned with respect to said mounting member;
   right and left front guide wheels mounted on said front pivot pin so that said guide wheels are rotatably mounted with respect to said mounting member, said front right and left guide wheels being axially spaced with respect to each other;
   right and left rear guide wheels mounted on said rear pivot pin so that each of said rear guide wheels is rotatably mounted with respect to said mounting member, said right and left rear guide wheels being axially positioned with respect to each other along the length of said rear pivot pin, each of said guide wheels having a surface of revolution thereon around its respective axis of rotation with said surfaces of revolution being such as to guide fishing line therearound so that fishing line can extend successively around said front and rear guide wheels;

right and left front plates mounted on said mounting member with said front guide wheels therebetween, and right and left rear plates mounted on said mounting member with said rear guide wheels therebetween;

spacer pins between said plates, said spacer pins being positioned between said plates away from said mounting member; and at least one of said spacer pins being provided with a guide roller thereon so that fishing line is guided by said guide roller onto one of said guide wheels.

* * * * *